United States Patent [19]

Laney

[11] Patent Number: 5,634,036
[45] Date of Patent: May 27, 1997

[54] METHOD AND APPARATUS FOR PROTECTING MEMORY WITH VARIABLE VISIBILITY OF SEGMENT DESCRIPTOR TABLES

[75] Inventor: Clifton W. Laney, Beaverton, Oreg.

[73] Assignee: Intel Corporation, Santa Clara, Calif.

[21] Appl. No.: 394,843

[22] Filed: Feb. 27, 1995

[51] Int. Cl.⁶ .......................... G06F 12/00; G06F 12/02; G06F 9/26; G06F 9/34
[52] U.S. Cl. ..................... 395/477; 395/478; 395/479; 395/474; 395/490
[58] Field of Search ............................. 395/477, 490, 395/726, 427, 474, 478, 479, 481

[56] References Cited

U.S. PATENT DOCUMENTS 4,442,484 4/1984 Childs, Jr. et al. .................. 364/200
4,890,223 12/1989 Cruess et al. ........................ 364/200

*Primary Examiner*—David K. Moore
*Assistant Examiner*—Than V. Nguyen
*Attorney, Agent, or Firm*—Blakely, Sokoloff, Taylor & Zafman

[57] ABSTRACT

An additional function is provided to an otherwise conventional operating system for superimposing visibility windows on the GDT and the LDTs for the purpose of memory protection. In a first embodiment, the operating system is also provided with a first additional control logic for selectively invoking the visibility window function to impose visibility windows of different window sizes for different tasks. In a second embodiment, the operating system is provided with a second additional control logic for selectively invoking the visibility window function to impose visibility windows of different window sizes for different operating system functions. In a third embodiment, the operating system is provided with the first as well as the second additional control logic.

13 Claims, 7 Drawing Sheets

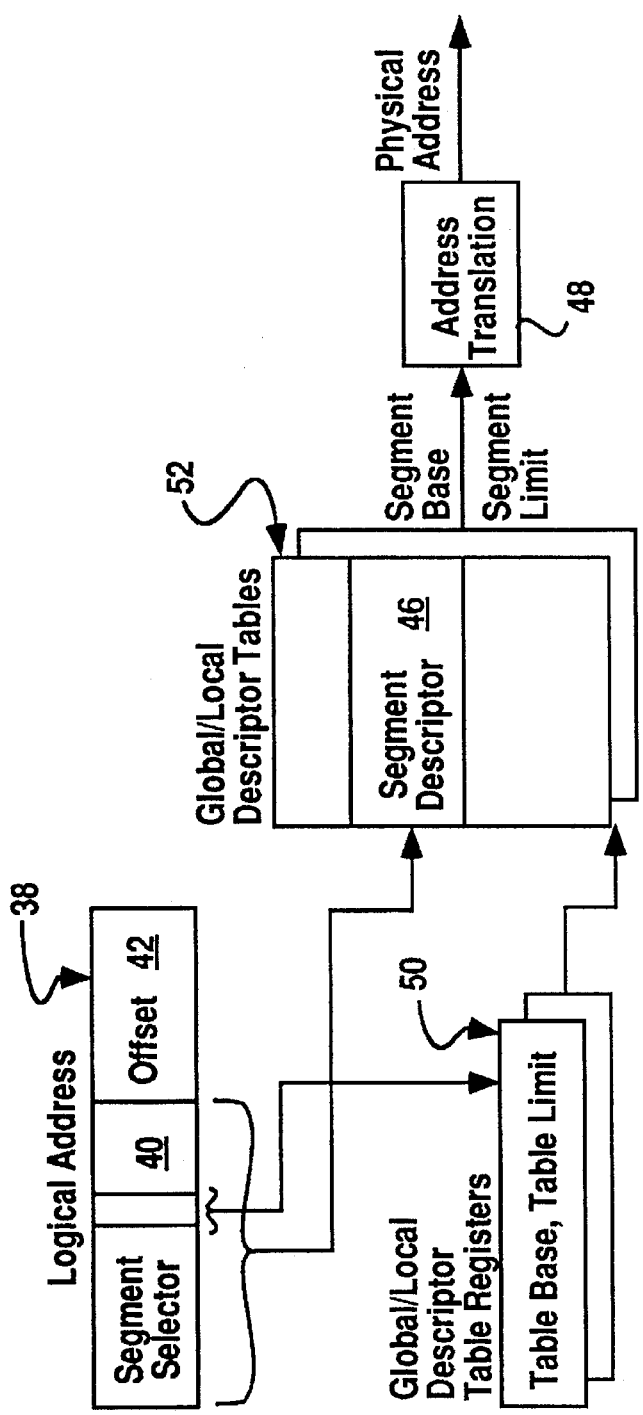
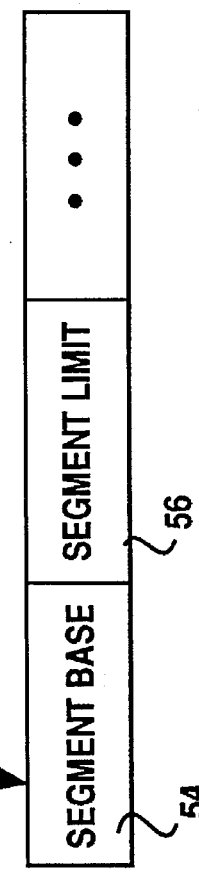
*Figure 3a*
*Figure 3b*

METHOD AND APPARATUS FOR PROTECTING MEMORY WITH VARIABLE VISIBILITY OF SEGMENT DESCRIPTOR TABLES

BACKGROUND OF THE INVENTION

1. Field of the Invention

The present invention relates to the field of computer systems. More specifically, the present invention relates to memory protection on these computer systems.

2. Background Information

Various techniques for protecting memory of computer systems from "unauthorized" usage by executing programs are known in the art. These protection techniques include restricting access to and/or operations that can be performed against certain parts of memory. For examples, executing programs may be denied access unless the executing programs are trustworthy such as supervisory programs, or executing programs may be prevented from performing write operations unless the targeted memory locations are "writeable". These access and operational controls may be implemented at the memory segment as well as memory page level.

Today, most modern computer systems including Intel Architecture based computer systems employ multiple memory protection schemes. One of the key element employed in Intel Architecture based computer system for providing memory protection is the Segment Descriptor Table, wherein segment protection attributes are stored in the segments' corresponding descriptors. Each Intel Architecture based computer system may include one global Segment Descriptor Table, known as GDT, and/or one or more local Segment Descriptor Tables, known as LDTs. The GDT is applicable to/shared by all tasks, whereas a LDT may be applicable to/used by only one task or applicable to/shared by multiple tasks also.

One particular problem of memory protection that is of particular interest is to shield certain segments of system memory from selected executing tasks or functions at selected times. For example, an operating system may want to make available certain memory segments having extra sensitive data to only selected trustworthy tasks at selected times. As a further example, an operating system may want to reserve certain memory segments for special usage under certain execution condition such as executing application in place, as described in the copending U.S. patent application, Ser. No. 08/394,619, filed contemporaneously, entitled Method and Apparatus for Executing Application In Place from ROM, Flash Memory and the like, or executing certain "highly sensitive" functions.

The typical prior art approach is to have the operating system zeroes out the corresponding descriptors of these memory segments in the applicable GDT/LDT(s) (and "set them aside" if they are to be reserved for special use). In the case of "exclusive" LDTs (i.e. one LDT per task), the same segment selector may be included in multiple LDTs, therefore multiple zeroed out operations would have to be performed. In the case of the GDT and a LDT shared by multiple tasks, the zeroing out of the segment descriptors has to be performed each time an "untrusted" task is switched in, and the zeroed out segment descriptors have to be restored either when the "untrusted" task is switched out or when the next "trusted" task is switched in. In either case, if visibility is to be different for functions of different trustworthiness, similar zeroing out and restoration operations would have to be performed each time the trustworthiness of the "current" function changes.

Typically, a fixed overhead cost of 12 clock cycles and a variable cost of 3 clock cycles per segment descriptor are required each time a block of segment descriptors in the GDT or a LDT have to be zeroed out. Since, zeroing out of segment descriptors have to be performed multiple times or repetitively, this prior art approach of selectively shielding certain segments of system memory from executing tasks/functions is costly and inefficient. Thus, a less costly or more efficient approach is desirable. As will be disclosed in more detail below, the method and apparatus of the present invention achieves these and other desired results.

SUMMARY OF THE INVENTION

The desired results are achieved by providing an additional function to an otherwise conventional operating system for superimposing visibility windows on the GDT and the LDTs. In a first embodiment, the operating system is also provided with a first additional control logic for selectively invoking the visibility window function to impose visibility windows of different window sizes for different tasks. In a second embodiment, the operating system is provided with a second additional control logic for selectively invoking the visibility window function to impose visibility windows of different window sizes for different operating system functions. In a third embodiment, the operating system is provided with the first as well as the second additional control logic.

In all three embodiments, the visibility window function is provided as a new "extended" memory management function of the kernel. Upon invocation, the visibility window function superimposes the visibility window by writing an appropriate new limit value into the limit field of the particular GDTR/LDTR, altering the number of GDT/LDT segment descriptors visible accordingly.

For the first and third embodiment, the first additional control logic is provided as a new "extended" task management function of the operating system's kernel. The new "extended" task management function adjusts the visibility window on a task by task basis. For the second and third embodiment, the second additional control logic is provided as an integral part of selected function invocation and return logic of the operating system's kernel. These selected function invocation and return logic adjust and restore the visibility window for selected operating system functions.

BRIEF DESCRIPTION OF DRAWINGS

The present invention will be described by way of exemplary embodiments, but not limitations, illustrated in the accompanying drawings in which like references denote similar elements, and in which:

FIGS. 3a–3b illustrate various aspects of segmentation memory management supported by the exemplary computer system of FIG. 1;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
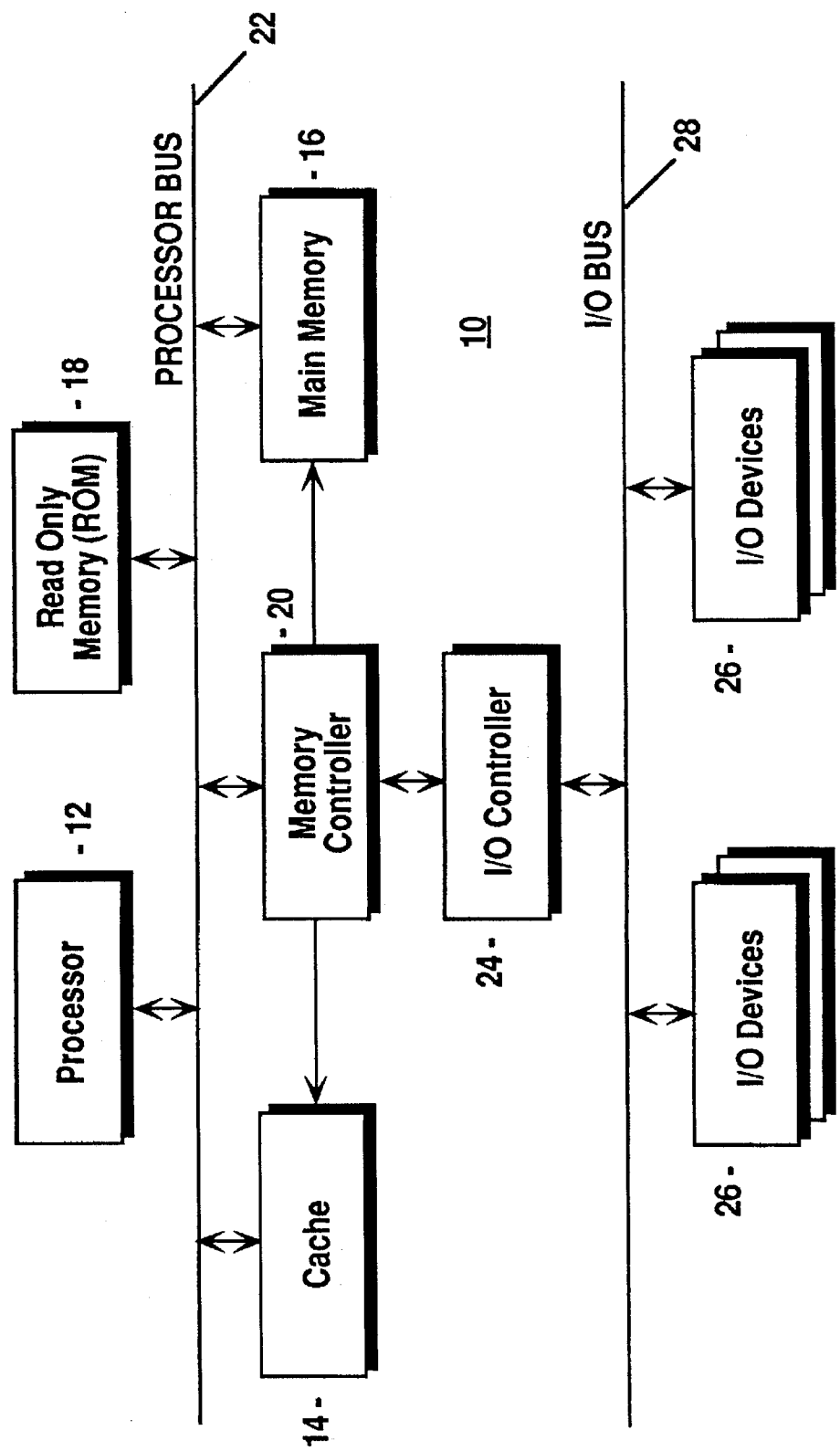
FIG. 1 illustrates an exemplary computer system incorporating the teachings of the present invention.

Referring now to FIG. 1, a block diagram illustrating an exemplary computer system incorporating the teachings of the present invention is shown. Exemplary computer system 10 includes processor 12, cache memory 14, main memory 16, ROM 18, memory controller 20, and processor bus 22 coupled to each other as shown. Exemplary computer system 10 further includes I/O controller 24, I/O devices 26 and I/O bus 28 coupled to each other as shown. The I/O and memory controllers 20 and 24 are also coupled to each other and include circuitry for mapping I/O devices into the physical address space of exemplary computer system 10. I/O devices 26 include but not limited to non-volatile storage medium, PCMCIA interface and their removably received PCMCIA cards, keyboard, mouse etc.

Except for the manner they are used, these elements are intended to represent a broad category of similar elements found in many computer systems whose constitutions and functions are well known and will not be otherwise further described. The manner these elements are used under the present invention will be described in detail below with additional references to the remaining figures.

Figure 2:
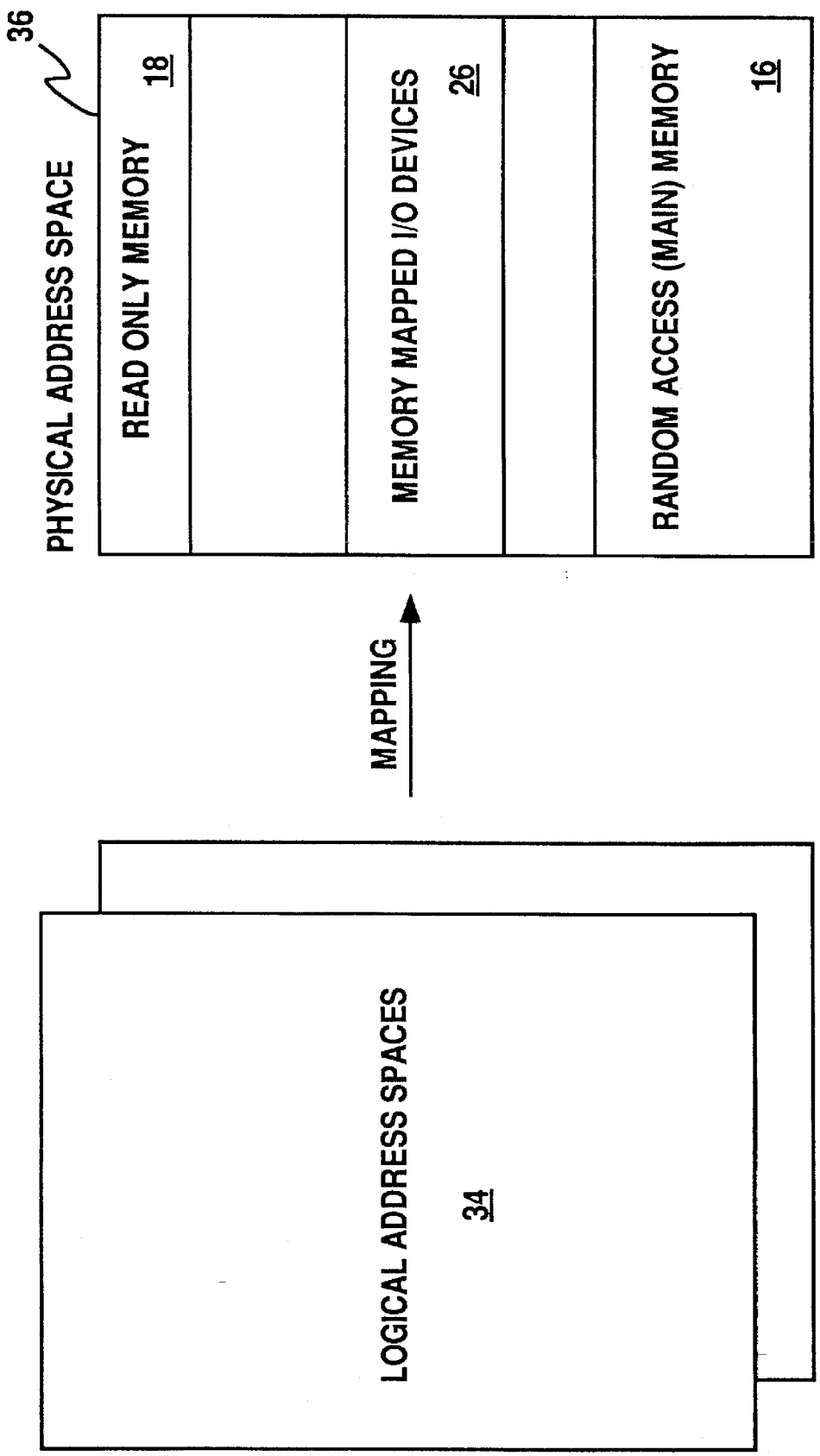
FIG. 2 illustrates mapping of I/O devices into the physical address space, and mapping of logical address spaces into the physical address space supported by the exemplary computer system of FIG. 1.

Turning now to FIG. 2, which illustrates the mapping of I/O devices into the physical address space, and mapping of logical address spaces into the physical address space supported by exemplary computer system 10 of FIG. 1. As shown, RAM 16, ROM 18, memory mapped I/O devices 26 are mapped into different regions of physical address space 36. The locations of the regions may be predetermined or dynamically determined depending on the support provided by the memory and I/O controllers 20 and 24, and the operating system of exemplary computer system 10.

As shown, exemplary computer system 10 also supports mapping of multiple logical address spaces 34 into physical address space 36. As will be described in more detail below, exemplary computer system 10 also supports a multi-segment model of memory management, wherein each segment is a separate logical address space 34. These logical address spaces 34 are typically mapped to different regions of physical address space 36. However they may be mapped to the same region of physical address space 36.

FIGS. 3a–3b illustrate various key aspects of exemplary computer system 10 for supporting the multi-segment model of memory management supported by. As shown, a logical address 38 comprises a segment selector 40 and an offset 42. Segment selector 40 is used to select a segment descriptor 46 from a global/local descriptor table 52, which is disposed in main memory 16. Each segment descriptor 46 comprises a segment base address 54 and a segment limit 56 of a memory segment. Address translation circuitry 48, which is a part of processor 12 uses the segment base address 54, segment limit 56 and offset 42 to generate the corresponding physical address.

The descriptor table base address and limit of the global/local descriptor table 52 are stored in one of the global or local descriptor table registers 50, which is part of processor 12. A portion of the segment selector 40 is used to index whether the content of the global or local descriptor table register 50 is to be used.

Although the present invention is being described with exemplary computer system 10 supporting segmentation memory management, it will be appreciated by those skilled in the art that the present invention may also be practiced with a flat model of memory management, since mapping all logical address spaces 34 to the entire physical address space 36 is functionally equivalent to a flat model of memory management. Furthermore, the present invention may also be practiced with paging in lieu of or in combination with either the flat or segmentation model of memory management.

Figure 4:
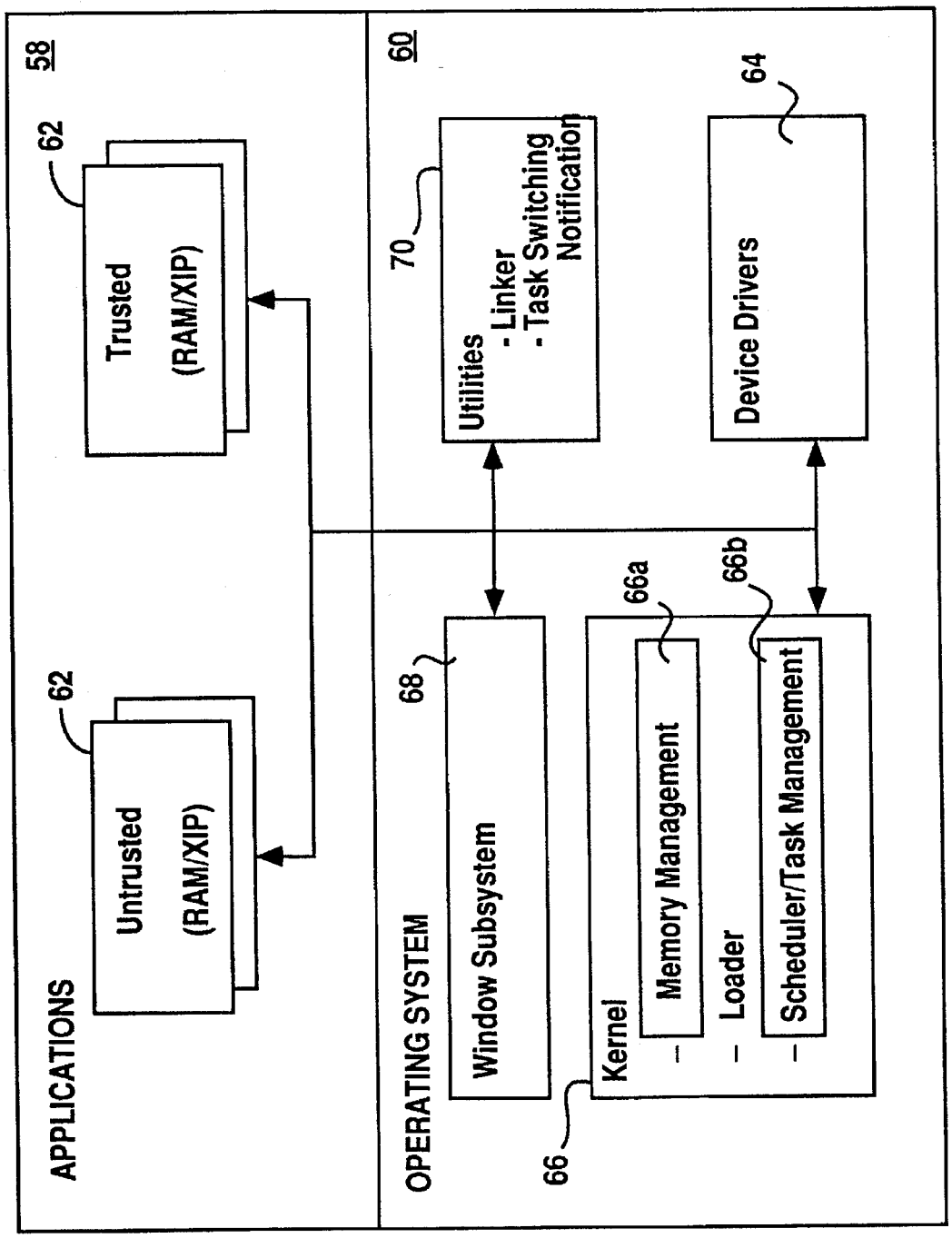
FIG. 4 illustrates the key software components of the exemplary computer system of FIG. 1.

Referring now to FIG. 4, a block diagram illustrating the key software elements of exemplary computer system 10 is shown. As illustrated, the key software elements include applications 58 and operating system 60 incorporated with the teachings of the present invention. Application 58 include applications 62 having different characteristics including but not limited to the trustworthiness and whether the applications are executed from RAM or in place (i.e. ROM, Flash Memory etc.). Operating system 60 includes kernel 66, utilities 70, device drivers 64, and preferably window subsystem 68.

Kernel 66 performs memory management, program loading, task scheduling, task management, function invocation, and related functions. In particular, kernel 66 includes GDT and LDTs 52 for managing and protecting memory 16. The memory management function 66a includes visibility window function of the present invention for superimposing a visibility window on the GDT/LDTs 52, which will be described in more detail below.

In a first embodiment, task management function 66b includes first control logic of the present invention for selectively invoking visibility function of memory management function 66a providing different visibility window sizes for different tasks at different times. In a second embodiment, selected function invocation logic of kernel 66 includes second control logic of the present invention for invoking visibility function of memory management function 66a providing different visibility window sizes for different function invocations. In a third embodiment, both the first and second control logic of the present invention are provided to task management function 66b and selected function invocation logic of kernel 66 respectively. First and second control logic will be described in more detail below. As will be obvious from the description logic, second control logic may also be provided to selected trustworthy applications other than kernel 66.

Utilities 70 perform functions such as linking, task switching notification. In particular, utilities 70 include a function for notifying task switching. Device drivers 64 and window subsystem 66 perform their conventional functions well known in the art.

In some embodiments, kernel 66 is further provided with "extended" memory management, loader, and task management functions 68, and utilities 70 are further provided with "extended" linker and installer functions for XIP applications 64, as described in the above mentioned copending U.S. Patent Application.

Figure 5:
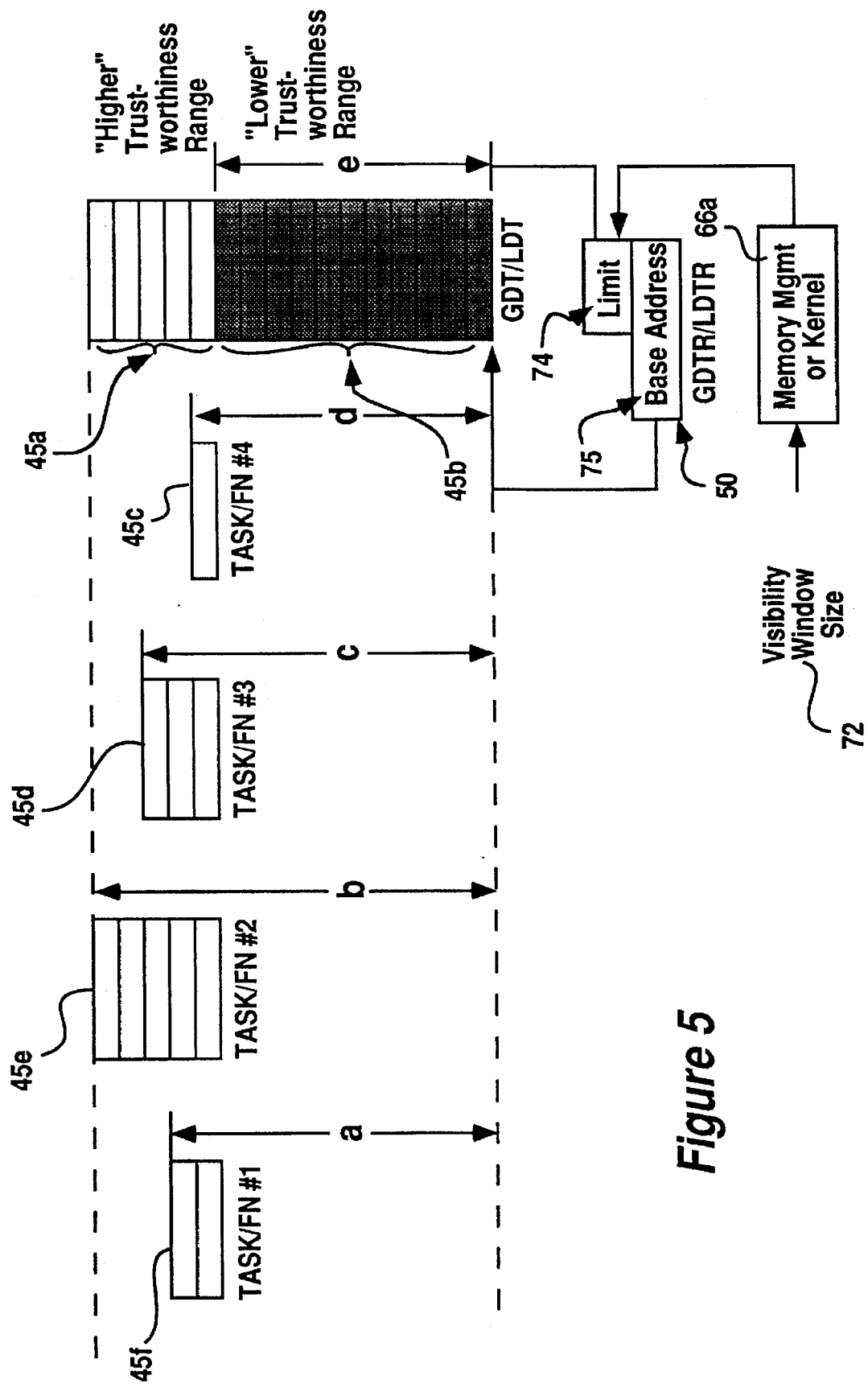
FIG. 5 illustrates variable visibility of the GDT/LDTs in accordance to the present invention.

FIG. 5 illustrates variable visibility window of the present invention. As shown, visibility function of memory management function 66a receives the desired visibility window size 72 from its invoker. In response, visibility function of memory management function 66a "translates" the desired visibility window size 72 into an appropriate limit value for the limit field 74 of GDTR/LDTR 50, and writes it into the GDTR/LDTR 50 accordingly. As a result, the number of GDT/LDT segment descriptors 46 visible is altered accordingly, thereby effectuating a variable visibility window on the GDT/LDT 52. For example, writing the value "e" into the limit field 74 of GDTR/LDTR 50 exposes only the lower trustworthiness requirement segment descriptors 45b of the GDT/LDT currently pointed to by base address 75 stored in GDTR/LDTR 50, and no higher trustworthiness requirement segment descriptors 45a. As a further example, writing the value "d" into the limit field 74 of GDTR/LDTR 50 exposes the lower trustworthiness requirement segment descriptors 45b of the GDT/LDT currently pointed to by base address 75 stored in GDTR/LDTR 50, and one higher trustworthiness requirement segment descriptor 45c.

As will be appreciated by those skilled in the art, typically each writing of a limit value into the limit field 74 of the GDTR/LDTR 50 takes about 11 clock cycles. Thus, the approach of the present invention represents a significant cumulative performance improvement over the prior art approach.

Figure 6B:
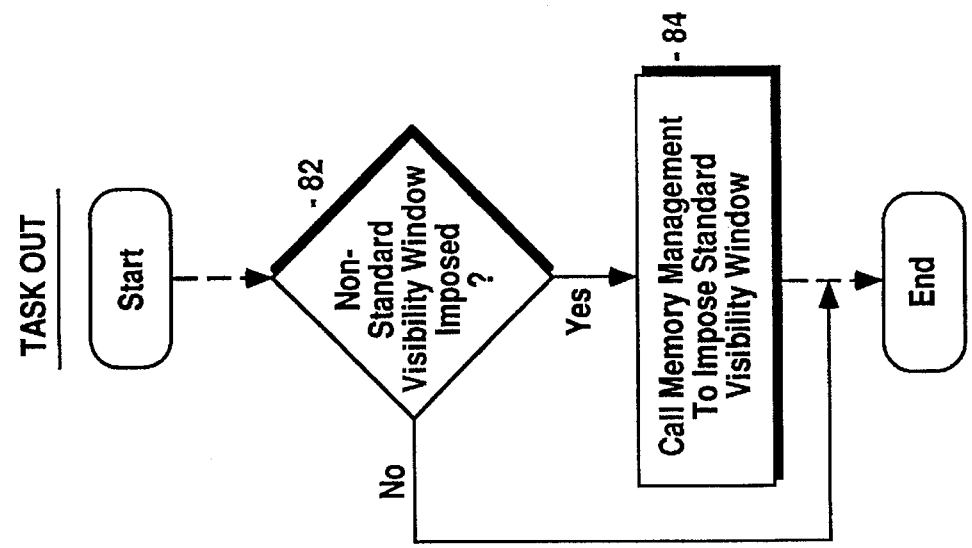
FIGS. 6a–6b illustrate the operational steps performed at task in and task out times for some embodiments of the present invention.
Figure 6A:
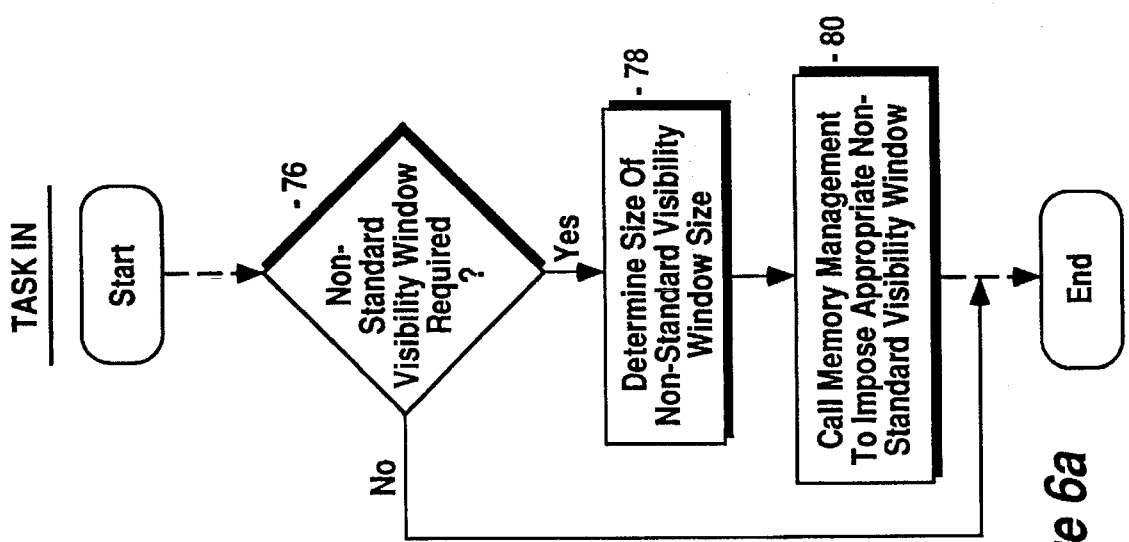

FIGS. 6a–6b illustrate the added operational steps of task management function 66b of the present invention for some embodiments, performed at task in and task out times. As shown, at task in time, in addition to the normal task in operational steps performed, task management function 66b determines whether the incoming task requires a non-default visibility window, step 76, and if so, what's the appropriate visibility window size, step 78. The determination may be made in accordance to the incoming task's trustworthiness, where the task is executed (i.e. in RAM or in place), and/or a number of other application dependent factors. These information may be stored in a variety of manners including but not limited to the task's module table. Upon determining the non-default visibility window size, step 78, task management function 66b invokes memory management function 66a to impose the non-default visibility window, providing the non-default visibility window size, step 80. At task out time, in addition to the normal task out operational steps performed, task management function 66b determines if a non-default visibility window was imposed on GDT/LDT 52 for the outgoing task, step 82. If so, task management function 66b invokes memory management function 66a, providing the default visibility window size, to restore the visibility window to the default visibility window, step 84.

In some embodiments, "lower" segment descriptors 46 of the GDT/LDT 52 are used to describe memory segments of RAM 16, whereas "upper" segment descriptors 46 are used to describe memory segments of ROM 18 and/or PCMCIA cards of I/O devices 26. The task management function 66a invokes the memory management function 66b to impose a "default" visibility window exposing only the "lower" segment descriptors 46 for RAM based applications 62, and variable non-default visibility windows exposing the "lower" as well as some or all of the "upper" segment descriptors 46 for execute-in-place applications 62 depending on their needs.

Figure 7B:
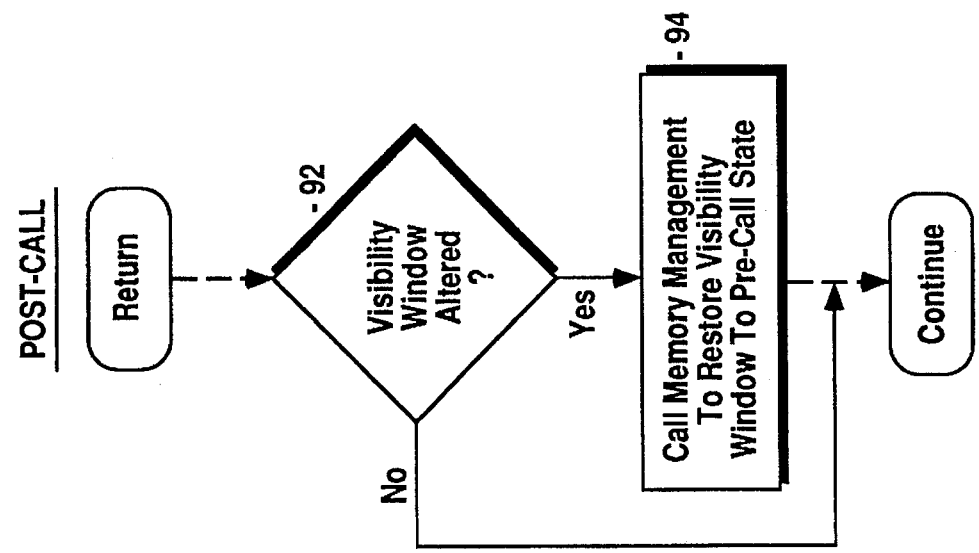
FIGS. 7a–7b illustrate the operational steps performed at function invocation and function return times for some embodiments of the present invention.
Figure 7A:
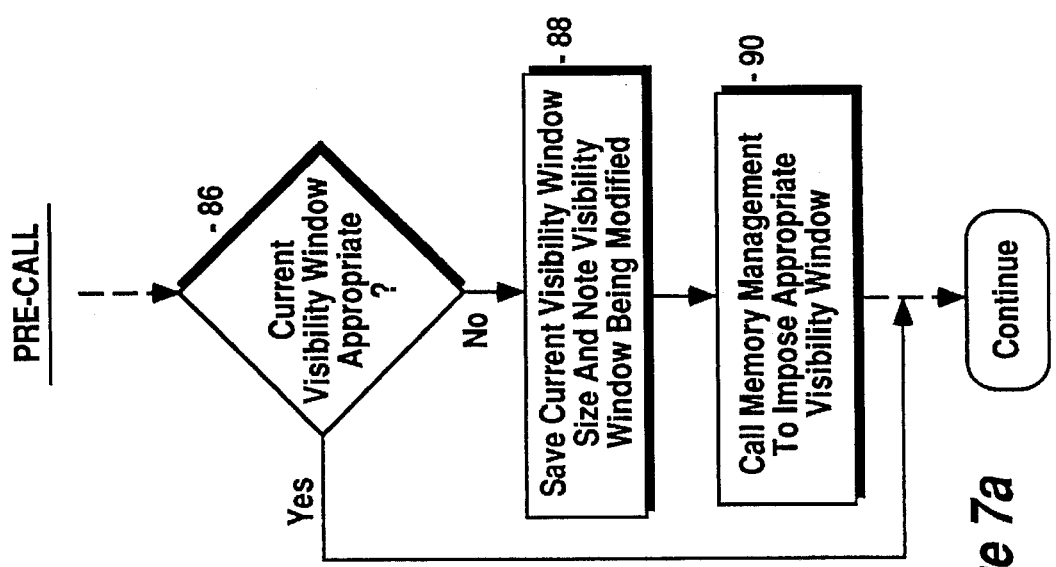

FIGS. 7a–7b illustrate the added operational steps of selected function invocation logic of kernel 66 of the present invention for some embodiments, performed at function call and function return times. As shown, prior to invoking a function, kernel 66 determines whether the current visibility window imposed on the GDT/LDT 52 is appropriate for the function to be invoked, step 86. If the current visibility window is inappropriate, kernel 66 saves the current visibility window size, and notes the fact that it is modifying the visibility window, step 88. Upon recording the current visibility window size, and noting its modification, kernel 66 invokes memory management function 66a to impose the appropriate visibility window, providing the appropriate visibility window size, step 90. Upon returning from the function call, kernel 66 determines if the visibility window was altered prior to the function call, step 92. If the visibility window was altered, kernel 66 invokes memory management function 66a, providing the saved visibility window size, to restore the visibility window to the pre-function call visibility window, step 94.

Thus, a method and apparatus for protecting memory with task based visibility of segment descriptor tables has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system comprising:

a) random-access-memory (RAM) for storing loaded program modules and associated data, including an operating system load module and a segment descriptor table, the segment descriptor table when created having a first and a second plurality of segment descriptors describing memory segments of a first and a second memory type of the computer system, the operating system having memory management functions that include a visibility window function for dynamically superimposing a first and a second visibility window over the content of the segment descriptor table, exposing the first plurality of segment descriptors for tasks being executed with a first memory configuration, and the first as well as at least a portion Of the second plurality of segment descriptors for tasks being executed with a second memory configuration, during operation;

b) a processor coupled to the memory for executing tasks; and c) non-volatile storage coupled to the processor and memory storing program objects from which the loaded program modules are created, including the operating system.

2. The computer system as set forth in claim 1, wherein the segment descriptor table when created occupies contiguous memory locations defined by a beginning memory location and an extent size;

the processor includes a register for storing a base address value and a limit value denoting the beginning memory location and the extent size respectively;

the visibility window function superimposes either the first or the second visibility window by writing either a first or a second effective limit value into the register denoting either a first or a second effective extent size for the segment descriptor table.

3. The computer system as set forth in claim 1, wherein the operating system supports multitasking;

the operating system further includes task management functions that include a task-in and a task-out function, the task-in function invoking the visibility window function to dynamically superimpose the second visibility window at task-in time whenever an incoming task is to be executed with the second memory configuration, requiring the second visibility window, and the task-out function invoking the visibility function to re-impose the first visibility window at task-out time whenever the second window was previously imposed for an outgoing task.

4. The computer system as set forth in claim 1, wherein the operating system further includes an internal function and corresponding function invocation and function return logic, the function invocation logic including logic for determining whether the first visibility window is an appropriate visibility window for the internal function prior to invoking the internal function, and if the first visibility window is not the appropriate visibility window, invoking the visibility function to impose the second visibility window, the function return logic including logic for determining whether the first visibility window has been replaced upon returning from the internal function, and if the first visibility window was replaced, invoking the visibility window function to restore the pre-call first visibility window.

5. The computer system as set forth in claim 1, wherein the computer system further comprises read-only memory (ROM) storing pre-loaded program modules to be executed in place;

the first plurality of segment descriptors describe memory segments of the RAM, and the second plurality of segment descriptors describe memory segments of the ROM;

the visibility window function is used to dynamically superimpose the first visibility window exposing only the first plurality of segment descriptors if the task is executing out of the RAM, and the second visibility window exposing the first as well as a portion of the second plurality of segment descriptors if the task is executing in place from the ROM.

6. The computer system as set forth in claim 1, wherein the computer system further comprises a PCMCIA interface for removably receiving a PCMCIA card having pre-loaded program modules to be executed in place;

the first plurality of segment descriptors describe memory segments of the RAM, and the second plurality of segment descriptors describe memory segments of the PCMCIA card;

the visibility window function is used to superimpose the first visibility window exposing only the first plurality of segment descriptors if the task is executing out of the RAM, and the second visibility window exposing the first as well as a portion of the second plurality of segment descriptors if the task is executing in place from the PCMCIA card.

7. A method for protecting memory of a computer system, the method comprising the steps of:

a) while a task is being switched into context, determining whether the task is to be executed with a non-default memory configuration, such that a non-default visibility window is to be superimposed on a segment descriptor table to expose at least a portion of a second as well as a first plurality of segment descriptors describing memory segments of a second as well as a first memory type of the computer system, the second plurality of segment descriptors being normally hidden if a default visibility window is employed; and b) upon determining that the non-default visibility window is to be superimposed, invoking a visibility window function to superimpose the non-default visibility window over the segment descriptor table accordingly.

8. The method as set forth in claim 7, wherein step (b) comprises writing either a first or a second effective limit value into a register of the computer system, denoting either a first or a second effective extent size of the segment descriptor table, the first or the second effective extent size in conjunction with a beginning memory location define effective contiguous memory locations occupied by the segment descriptor table.

9. The method as set forth in claim 7, wherein the computer system comprises random access memory (RAM) for storing dynamically loaded program modules, as well as read-only memory (ROM) storing pre-loaded program modules to be executed in place;

the first plurality of segment descriptors describe memory segments of the RAM and the second plurality of segment descriptors describe memory segments of the ROM;

step (a) comprises determining whether an incoming task is an execute-in-place task, and if the incoming task is an execute-in-place task, determining the incoming execute-in-place task's need for the second plurality of memory segment descriptors; and step (b) comprises invoking the visibility window function to superimpose the non-default visibility window accordingly, exposing the first as well as at least a portion of the second plurality of segment descriptors to the incoming task.

10. The method as set forth in claim 7, wherein the computer system comprises random access memory (RAM) for storing dynamically loaded program modules, as well as a PCMCIA card interface for removably receiving a PCMCIA card storing pre-loaded program modules to be executed in place;

the first plurality of segment descriptors describe memory segments of the RAM and the second plurality of segment descriptors describe memory segments of the PCMCIA card;

step (a) comprises determining whether an incoming task is a task to be executed in place from the PCMCIA card, and if the incoming task is a task to be executed in place from the PCMCIA card, determining the incoming execute-in-place task's need for the second plurality of memory descriptors; and step (b) comprises invoking the visibility window function to superimpose the non-default visibility window accordingly exposing the first as well as at least a portion of the second plurality of segment descriptors to the incoming task.

11. The method as set forth in claim 7, wherein the method further comprises the steps of:

c) while a task is being switched out of context, determining whether the non-default visibility window was superimposed on the segment descriptor table for the outgoing task; and b) upon determining the non-default visibility window was superimposed for the outgoing task, invoking the visibility window function to re-impose the default visibility window over the segment descriptor table accordingly.

12. A method for protecting memory of a computer system, the method comprising the steps of:

a) prior to a function being invoked, determining whether a first visibility window into a segment descriptor table having a first and a second plurality of segment descriptors describing memory segments of a first and a second memory type is an appropriate visibility window for the function to be invoked;

b) if it is determined that in accordance with the function's execution memory configuration, the first visibility window is inappropriate for the function to be invoked, then invoking an visibility window function to impose a second visibility window exposing at least a portion of the second plurality of segment descriptors as well as the first plurality of segment descriptors; and c) upon determining the first visibility window is the appropriate visibility window or having invoked the visibility window function to impose the second visibility window, invoking the function.

13. The method as set forth in claim 12, wherein the method further comprises the step of:

c) upon returning from the invoked function, determining if the first visibility window into the segment descriptor table was replaced by the second visibility window prior to invoking the function;

d) if the first visibility window was replaced by the second visibility window prior to invoking the function, invoking the visibility window function to restore the first visibility window.

* * * * *